(12) United States Patent
Kobayashi

(10) Patent No.: US 7,470,029 B2
(45) Date of Patent: Dec. 30, 2008

(54) IMAGE PROCESSING SYSTEM, PROJECTOR, INFORMATION STORAGE MEDIUM AND IMAGE PROCESSING METHOD

(75) Inventor: Masanobu Kobayashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 777 days.

(21) Appl. No.: 10/867,675

(22) Filed: Jun. 16, 2004

(65) Prior Publication Data
US 2005/0036117 A1 Feb. 17, 2005

(30) Foreign Application Priority Data
Jul. 11, 2003 (JP) .............................. 2003-273358

(51) Int. Cl.
G03B 21/00 (2006.01)
G03B 21/14 (2006.01)

(52) U.S. Cl. .................................. 353/69; 348/745

(58) Field of Classification Search ............... 353/69, 353/70, 121; 348/745–747
See application file for complete search history.

(56) References Cited

U.S. PATENT DOCUMENTS

| 5,742,698 | A | 4/1998 | Minami et al. |
| 5,793,340 | A | 8/1998 | Morita et al. |
| 6,527,395 | B1 | 3/2003 | Raskar et al. |
| 6,592,228 | B1 * | 7/2003 | Kawashima et al. ........ 353/101 |
| 6,753,907 | B1 * | 6/2004 | Sukthankar et al. ...... 348/222.1 |
| 7,014,323 | B2 * | 3/2006 | Kobayashi et al. ............ 353/69 |
| 7,167,645 | B2 * | 1/2007 | Matsuda et al. ............. 396/213 |
| 2002/0021418 | A1 * | 2/2002 | Raskar .......................... 353/69 |
| 2003/0035590 | A1 * | 2/2003 | Takeuchi et al. ............ 382/254 |
| 2006/0017890 | A1 * | 1/2006 | Inazumi ........................ 353/69 |

FOREIGN PATENT DOCUMENTS

| JP | A 08-009309 | 1/1996 |
| JP | A 08-219733 | 8/1996 |
| JP | A 10-200836 | 7/1998 |
| JP | A 2000-241874 | 9/2000 |
| JP | A 2001-61121 | 3/2001 |
| JP | A-2001-320652 | 11/2001 |
| JP | A 2002-062842 | 2/2002 |
| JP | A 2002-247614 | 8/2002 |
| KR | A-1998-58919 | 10/1998 |
| WO | WO 01/47259 A | 6/2001 |

* cited by examiner

Primary Examiner—Andrew T Sever
(74) Attorney, Agent, or Firm—Oliff & Berridge PLC

(57) ABSTRACT

To provide an image processing system and the like which can correct a distortion of a projected image through only a single sensor, a projector has a calibration image information generating section which generates image information used to display a rectangular calibration image; an image projection section which projects the calibration image onto a projection target, based on the image information; a sensing section which senses a region including the projected calibration image plane and generates sensing information; a projection area information generating section which generates shortest-distance projection area information based on the sensing information in such a state that a distance between the projection section and the projection target is different from the distance in an actual operating condition, and generates actual projection area information based on the sensing information in the actual operating condition; and a correction information generating section which generates image distortion correction information, based on the shortest-distance projection area information and actual projection area information.

8 Claims, 11 Drawing Sheets

FIG. 9

| INTER-COORDINATE DISTANCE | PROJECTION DISTANCE |
|---|---|
| 0dot | 1.5m |
| 20dot | 2.0m |
| 30dot | 2.5m |
| 35dot | 3.0m |
| ⋮ | ⋮ |

FIG. 11

| θy (DEGREE) | θx (DEGREE) | E | | F | | G | | H | |
|---|---|---|---|---|---|---|---|---|---|
| | | x | y | x | y | x | y | x | y |
| 0 | 0 | 0 | 0 | 0 | 767 | 1023 | 767 | 1023 | 0 |
| 5 | 0 | 16 | 12 | 16 | 755 | 1023 | 767 | 1023 | 0 |
| 10 | 0 | 32 | 24 | 32 | 743 | 1023 | 767 | 1023 | 0 |
| 15 | 0 | 48 | 36 | 48 | 731 | 1023 | 767 | 1023 | 0 |
| ⋮ | ⋮ | ⋮ | ⋮ | ⋮ | ⋮ | ⋮ | ⋮ | ⋮ | ⋮ |

IMAGE PROCESSING SYSTEM, PROJECTOR, INFORMATION STORAGE MEDIUM AND IMAGE PROCESSING METHOD

Japanese Patent Application No. 2003-273358, filed on Jul. 11, 2003, is hereby incorporated by reference in its entirety.

BACKGROUND OF THE INVENTION

The present invention relates to an image processing system, projector, program, information storage medium and image processing method which can correct the distortion of an image.

When an image is projected by an image projection device such as a projector and if the optical axis of the projected light is not coincident with a projection target such as a screen, the projected image may be distorted to create a so-called keystone distortion from image distortions in the vertical and horizontal directions.

For such a reason, the image projection device must project a proper image after the distortion has been eliminated.

However, the general image projection device having an image distortion correcting function includes an inclination sensor which can correct the image distortion in the vertical direction, but not the image distortion in the horizontal direction.

In order to correct the distortion in the horizontal direction, a user must indicate four corner points in a screen by use of a mouse or the like so that the image projection device can semi-automatically correct the image distortion in the horizontal direction, based on the user's indications. It is troublesome for the user to indicate the four corner points in the screen through the mouse or the like.

To solve such a problem, for example, Japanese Patent Laid-Open Application No. 2001-61121 has proposed a projector device which comprises a projection plane capturing means for capturing the shape of the projection plane by associating coordinates of the projector's image with coordinates of the camera's image based on an image taken by a camera, the taken image being projected when a pattern image is displayed, and determining three-dimensional coordinate of the position where the pattern image is projected through triangulation, and an image correction means for performing corrections for inclination and magnification in the original inputted image according to the sensed shape of the projection plane.

Japanese Patent Laid-Open Application No. 2001-61121 also describes that a known three-dimensional shape measuring device can be used as projection plane capturing means and that the projection plane sensing means are not essential for the invention thereof.

However, the known three-dimensional shape measuring device requires two cameras, for example, when the triangulation is to be carried out. This makes the structure complicated and increases the manufacturing cost.

Additionally, such a technique of detecting the shape of the projection target such as a screen to process the image as in the Japanese Patent Laid-Open Application No. 2001-61121 cannot be applied to a wall. Thus, projection targets to which such a technique can be applied will be limited.

BRIEF SUMMARY OF THE INVENTION

The present invention is made in view of the above-mentioned problem and may provide an image processing system, projector, program, information storage medium and image processing method, all of which can correct any distortion of an projected image by use of a single sensor for measuring the distance and angle between a reference projection point and a projection target.

An image processing system or projector according to an aspect of the present invention includes:

a calibration image information generating means for generating image information used to display a rectangular calibration image;

a projection means for projecting the calibration image onto a projection target, based on the image information;

a sensing means for sensing a region including the projected calibration image through a sensing plane and generating sensing information;

a projection area information generating means for generating temporary projection area information which indicates coordinates of four corners of the calibration image on the sensing plane, based on the sensing information in such a state that an entire portion of the calibration image is included within a sensing range of the sensing means and under such a state that a distance between the projection means and the projection target is different from the distance in an actual operating condition, and for generating actual projection area information which indicates the coordinates of the four corners of the calibration image in the sensing plane, based on the sensing information in the actual operating condition;

a correction information generating means for generating image distortion correction information; and a distortion correction means for correcting a distortion of the image, based on the image distortion correction information, wherein the correction information generating means has following functions of:

deriving an inter-coordinate distance between each of the coordinates of the four corners included in the temporary projection area information and corresponding one of the coordinates of the four corners included in the actual projection area information;

deriving a projection distance on an optical axis of the projection means between the projection means and each of the four corners of the calibration image on the projection target, based on projection distance data in which the inter-coordinate distance is associated with the projection distance and based on the inter-coordinate distance;

deriving three-dimensional coordinates of at least three of the four corners of the calibration image in a three-dimensional space for the projection means to process an image, based on the projection distance and the half angle-of-view in the projection means;

deriving an angle formed by the optical axis of the projection means and the projection target, based on the three-dimensional coordinates; and generating the image distortion correction information, based on the derived angle.

An image processing system or projector according to another aspect of the present invention includes:

a calibration image information generating section which generates image information used to display a rectangular calibration image;

a projection section which projects the calibration image onto a projection target, based on the image information;

a sensing section which senses a region including the projected calibration image through a sensing plane and generates sensing information;

a projection area information generating section which generates temporary projection area information which indicates coordinates of four corners of the calibration image on the sensing plane, based on the sensing information in such a state that an entire portion of the calibration image is included within a sensing range of the sensing section and under such a state that a distance between the projection section and the projection target is different from the distance in an actual operating condition, and generates actual projection area information which indicates the coordinates of the four corners of the calibration image in the sensing plane, based on the sensing information in the actual operating condition;

a correction information generating section which generates image distortion correction information; and a distortion correction section which corrects a distortion of the image, based on the image distortion correction information, wherein the correction information generating section has following functions of:

deriving an inter-coordinate distance between each of the coordinates of the four corners included in the temporary projection area information and corresponding one of the coordinates of the four corners included in the actual projection area information;

deriving a projection distance on an optical axis of the projection section between the projection section and each of the four corners of the calibration image on the projection target, based on projection distance data in which the inter-coordinate distance is associated with the projection distance and based on the inter-coordinate distance;

deriving three-dimensional coordinates of at least three of the four corners of the calibration image in a three-dimensional space for the projection section to process an image, based on the projection distance and the half angle-of-view in the projection section;

deriving an angle formed by the optical axis of the projection section and the projection target, based on the three-dimensional coordinates; and generating the image distortion correction information, based on the derived angle.

A computer-readable program according to a further aspect of the present invention causes a computer to function as:

a calibration image information generating means for generating image information used to display a rectangular calibration image;

a projection means for projecting the calibration image onto a projection target, based on the image information;

a sensing means for sensing a region including the projected calibration image through a sensing plane and generating sensing information;

a projection area information generating means for generating temporary projection area information which indicates coordinates of four corners of the calibration image on the sensing plane, based on the sensing information in such a state that an entire portion of the calibration image is included within a sensing range of the sensing means and under such a state that a distance between the projection means and the projection target is different from the distance in an actual operating condition, and for generating actual projection area information which indicates the coordinates of the four corners of the calibration image in the sensing plane, based on the sensing information in the actual operating condition;

a correction information generating means for generating image distortion correction information; and a distortion correction means for correcting a distortion of the image, based on the image distortion correction information, wherein the correction information generating means has following functions of:

deriving an inter-coordinate distance between each of the coordinates of the four corners included in the temporary projection area information and corresponding one of the coordinates of the four corners included in the actual projection area information;

deriving a projection distance on an optical axis of the projection means between the projection means and each of the four corners of the calibration image on the projection target, based on projection distance data in which the inter-coordinate distance is associated with the projection distance and based on the inter-coordinate distance;

deriving three-dimensional coordinates of at least three of the four corners of the calibration image in a three-dimensional space for the projection means to process an image, based on the projection distance and the half angle-of-view in the projection means;

deriving an angle formed by the optical axis of the projection means and the projection target, based on the three-dimensional coordinates; and generating the image distortion correction information, based on the derived angle.

An information storage medium according to a still further aspect of the present invention stores a computer-readable program which causes a computer to function as:

a calibration image information generating means for generating image information used to display a rectangular calibration image;

a projection means for projecting the calibration image onto a projection target, based on the image information;

a sensing means for sensing a region including the projected calibration image through a sensing plane and generating sensing information;

a projection area information generating means for generating temporary projection area information which indicates coordinates of four corners of the calibration image on the sensing plane, based on the sensing information in such a state that an entire portion of the calibration image is included within a sensing range of the sensing means and under such a state that a distance between the projection means and the projection target is different from the distance in an actual operating condition, and for generating actual projection area information which indicates the coordinates of the four corners of the calibration image in the sensing plane, based on the sensing information in the actual operating condition;

a correction information generating means for generating image distortion correction information; and a distortion correction means for correcting a distortion of the image, based on the image distortion correction information, wherein the correction information generating means has following functions of:

deriving an inter-coordinate distance between each of the coordinates of the four corners included in the temporary projection area information and corresponding one of the coordinates of the four corners included in the actual projection area information;

deriving a projection distance on an optical axis of the projection means between the projection means and each of the four corners of the calibration image on the projection target, based on projection distance data in which the inter-coordinate distance is associated with the projection distance and based on the inter-coordinate distance;

deriving three-dimensional coordinates of at least three of the four corners of the calibration image in a three-dimensional space for the projection means to process an image, based on the projection distance and the half angle-of-view in the projection means;

deriving an angle formed by the optical axis of the projection means and the projection target, based on the three-dimensional coordinates; and generating the image distortion correction information, based on the derived angle.

An image processing method according to a yet further aspect of the present invention includes:

causing an image projection device to project a rectangular calibration image onto a projection target, sensing a region including the projected calibration image through a sensing plane, and generating first projection area information which indicates coordinates of four corners of the calibration image in the sensing plane, when a positional relationship between the image projection device and the projection target becomes a first state in which an entire portion of the calibration image is included within a sensing range;

causing the image projection device to project the calibration image onto the projection target, sensing the region including the projected calibration image through the sensing plane, and generating second projection area information which indicates the coordinates of the four corners of the calibration image in the sensing plane, when the positional relationship between the image projection device and the projection target becomes a second state in which an entire portion of the rectangular calibration image is included within the sensing range, the second state being different from the first state;

deriving an inter-coordinate distance between each of the coordinates of the four corners included in the first projection area information and the corresponding one of the coordinates of the four corners included in the second projection area information;

deriving a projection distance on an optical axis of a projected light between the image projection device and each of the coordinates of the four corners of the calibration image on the projection target, based on the projection distance data in which the inter-coordinate distance is associated with the projection distance and based on the inter-coordinate distance;

deriving three-dimensional coordinates of at least three of the four corners of the calibration image in a three-dimensional space for the image projecting device to process an image, based on the projection distance and the half angle-of-view in the projected light;

deriving an angle formed by the optical axis of the projected light and the projection target, based on the three-dimensional coordinates;

generating image distortion correction information, based on the derived angle; and correcting image distortion, based on the generated image distortion correction information.

In accordance with the present invention, the image processing system and the like can correct the distortions in the projected image by use of only a single sensor for measuring the distance and angle between the reference projection point and the projection target.

In accordance with the present invention, moreover, the image processing system and the like can be applied to various kinds of projection targets such as walls, resulting in improvement of its versatility, since the distortions in the projected image can be corrected without using a frame of a screen and the like.

With these image processing system, projector, program and information storage medium, the correction information generating means may have following functions of:

deriving a normal vector in the projection target, based on the three-dimensional coordinates; and deriving an angle formed by the optical axis of the projection means and the projection target, based on the normal vector and a directional vector of the optical axis of the projection means.

When the angle formed by the optical axis of the projected light and the projection target is derived, this image processing method may include:

deriving a normal vector in the projection target, based on the three-dimensional coordinates; and deriving an angle formed by the optical axis of the projected light and the projection target, based on the normal vector and a directional vector of the optical axis of the projected light.

BRIEF DESCRIPTION OF THE SEVERAL VIEWS OF THE DRAWING

FIG. 9 is a schematic view illustrating the data structure of the projection distance according to this example of this embodiment.

FIG. 11 is correcting data illustrating four corner coordinates in a corrected projection area according to this example of this embodiment.

DETAILED DESCRIPTION OF THE EMBODIMENT

In the description below, the present invention is applied to a projector which performs a distortion correction of an image, by way of example, with reference to the accompanying drawings. Note that the embodiments described hereunder do not in any way limit the scope of the invention defined by the claims laid out herein. Note also that all of the elements of these embodiments should not be taken as essential requirements to the means of the present invention.

Overall System

Figure 1:
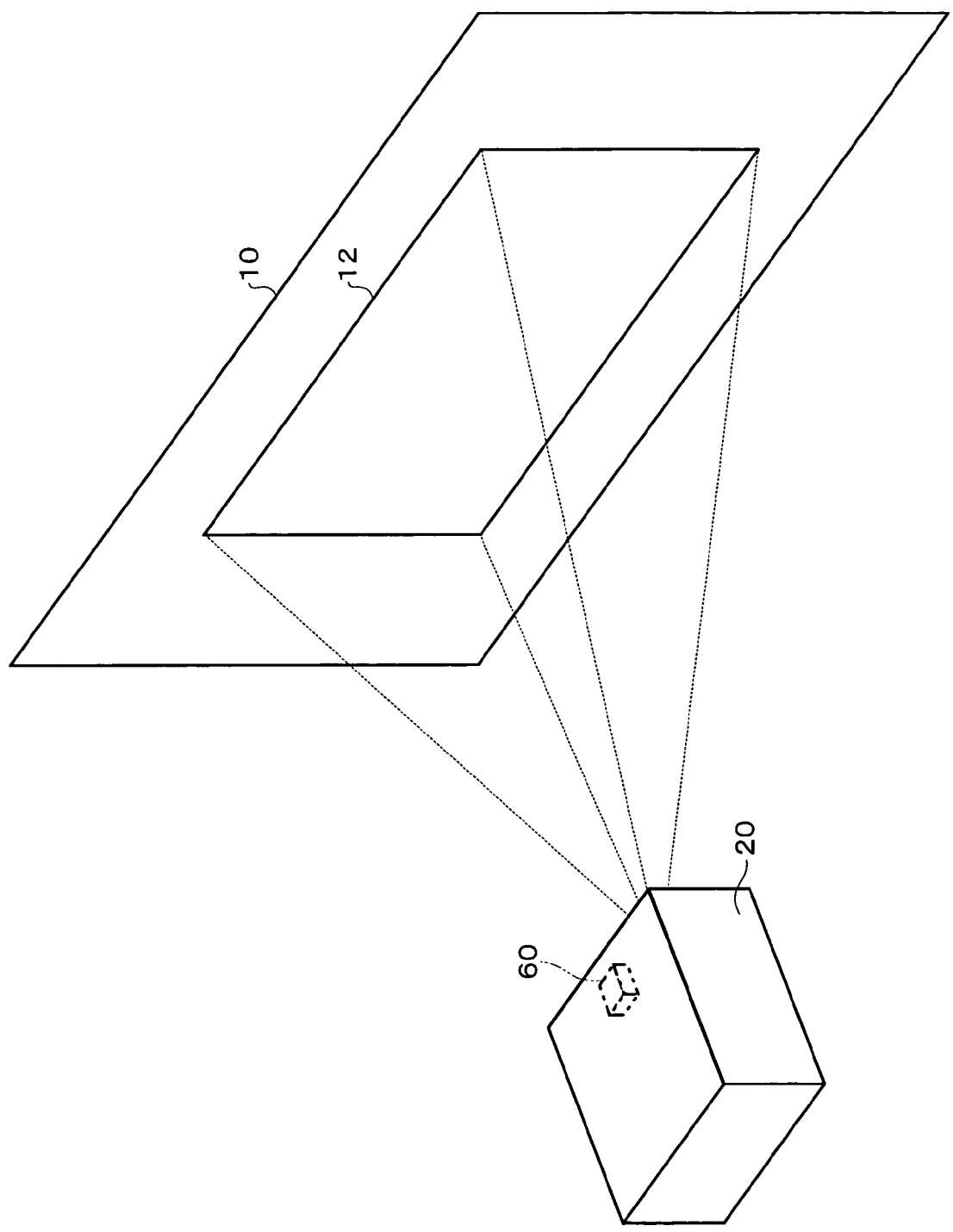
FIG. 1 is schematic view showing a state when an image is projected.

FIG. 1 is schematic view showing a state when an image is projected.

A projector 20 which is a kind of an image processing system projects an image toward a screen 10 which is a kind of a projection target. Thus, a projected image 12 is displayed on the screen 10.

In this embodiment, the projector 20 is not arranged directly in front of the screen 10. For such a reason, a distortion (e.g., a so-called keystone distortion) is occurred in the projected image 12.

In this embodiment, a sensor 60 which is part of a sensing means senses a region including the projected image 12. The projector 20 then derives a projection distance between the reference projection position of the projector 20 and each of four corners of the projected image 12 based on the sensing information from the sensor 60, and derives an angle between the optical axis in the projected light from the projector 20 and the screen 10.

The projector 20 further determines a distortion of the projected image 12 based on the projection distances and corrects input image signals to correct the distortions in the projected image 12.

Functional Blocks

Next, the functional blocks of the projector 20 for implementing such a feature will be described.

Figure 2:
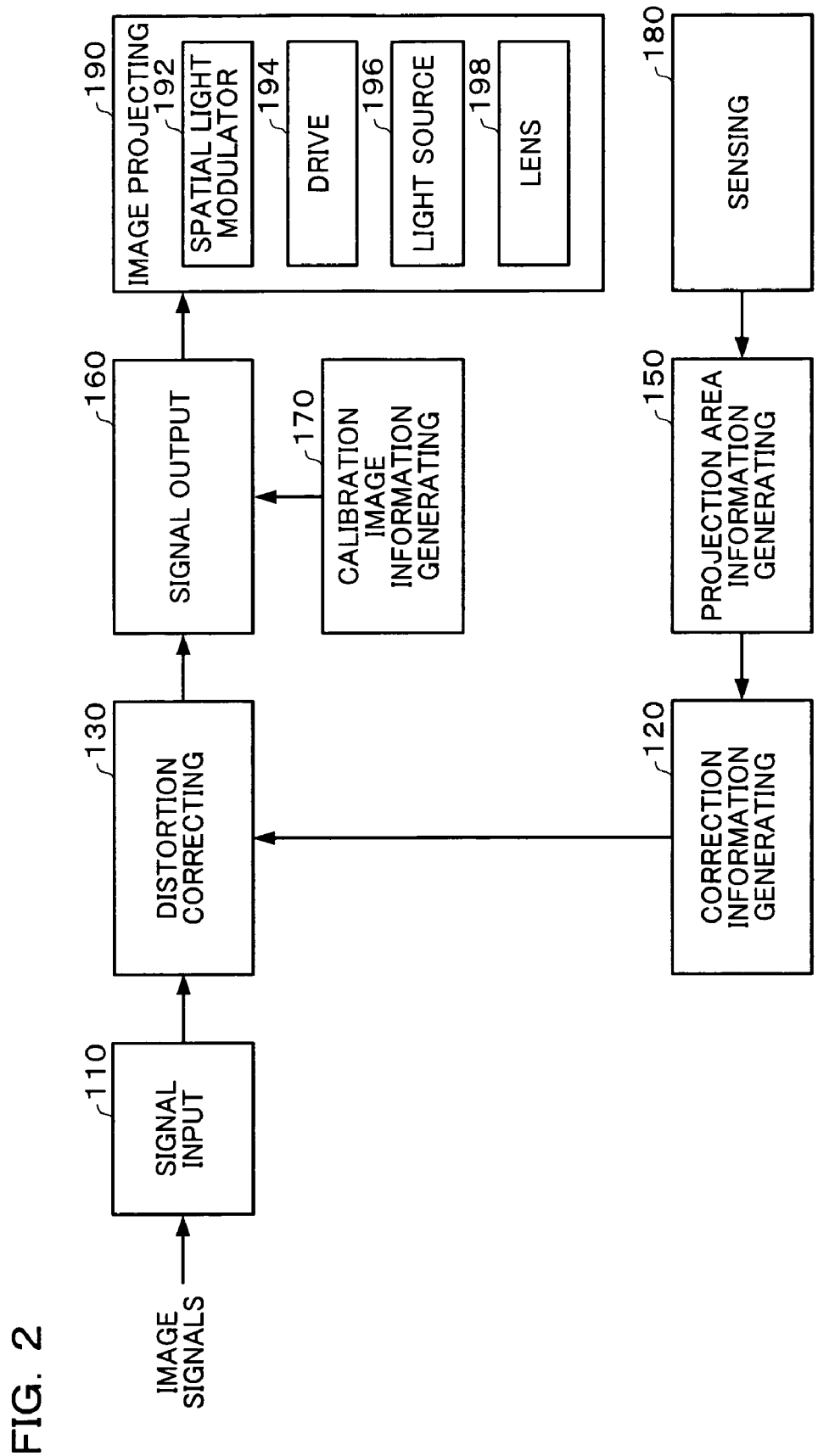
FIG. 2 is a functional block diagram of a projector according to one example of an embodiment of the present invention.

FIG. 2 is a functional block diagram of the projector 20 according to one example of this embodiment.

The projector 20 comprises a signal input section 110 for inputting image signals, a distortion correcting section 130 for correcting the inputted image signals so that the image distortion is corrected, a signal output section 160 for outputting the corrected image signals, an image projecting section 190 for projecting an image based on the image signals, the image projecting section 190 being a kind of projection means, and a calibration image information generating section 170 for generating calibration image information.

The projector 20 also comprises a sensing section 180 for sensing a region including the projected image 12 through the imaging sensing plane to generate sensing information, a projection area information generating section 150 for determining the region of the projected image 12 in the sensing plane of the sensor 60, based on the sensing information and a correction information generating section 120 for generating distortion correction information. The sensor 60 is included in the sensing section 180.

The image projecting section 190 comprises a spatial light modulator 192, a drive section 194 for driving the spatial light modulator 192, a light source 196 and a lens 198.

The drive section 194 drives the spatial light modulator 192 based on the image signals from the signal output section 160. The image projecting section 190 projects light from a light source 196 through the spatial light modulator 192 and lens 198.

The following means can be applied so that the functions of the respective sections in the projector 20 can be implemented into a computer.

Figure 3:
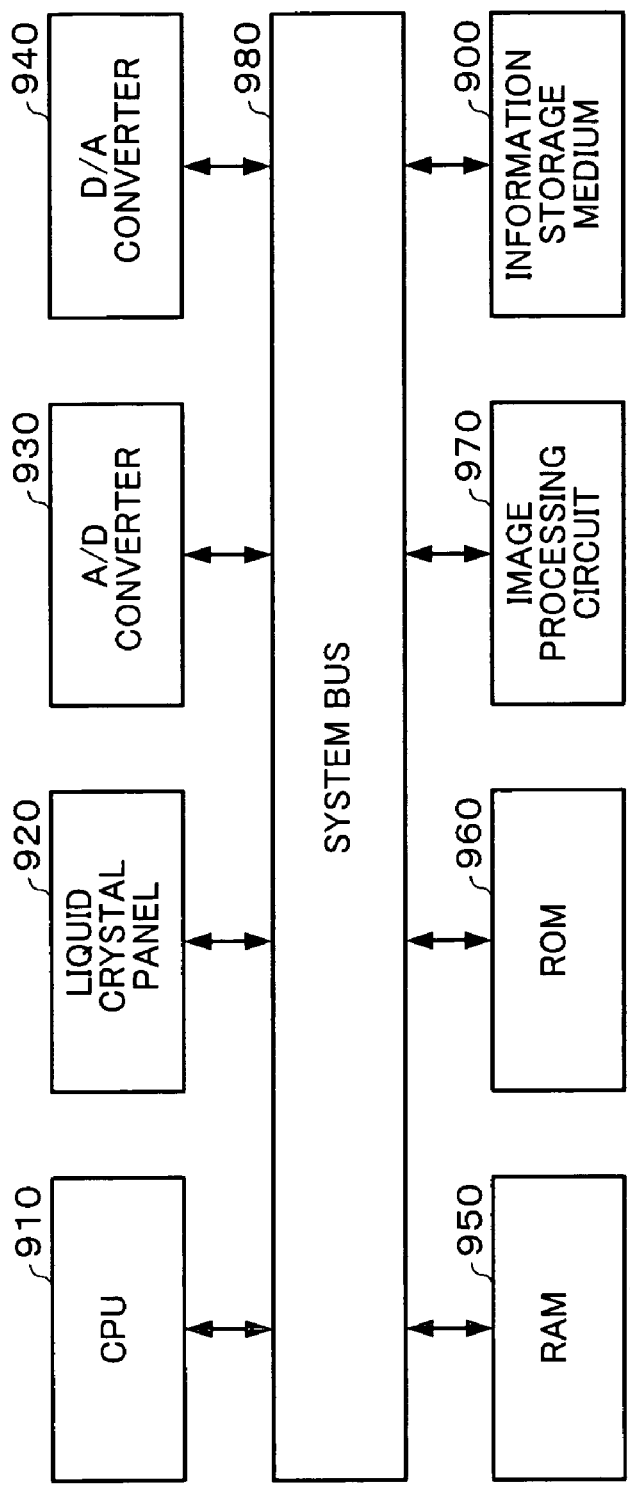
FIG. 3 is a hardware block diagram illustrating a projector according to this example of this embodiment.

FIG. 3 is a hardware block diagram illustrating a projector according to this example of this embodiment.

The signal input section 110 may be implemented, for example, by an A/D converter 930 or the like; the distortion correcting section 130 may be implemented, for example, by an image processing circuit 970, RAM 950, CPU 910 or the like; the signal output section 160 may be implemented, for example, by a D/A converter 940 or the like; the correction information generating section 120, projection area information generating section 150 and calibration image information generating section 170 may be, for example, by the image processing circuit 970, RAM 950 or the like; the sensing section 180 may be implemented, for example, by a CCD sensor, a CMOS sensor, an RGB sensor or the like; the spatial light modulator 192 may be implemented, for example, by a liquid crystal panel 920, a ROM 960 for storing a liquid crystal light valve driver for driving the liquid crystal panel 920 or the like.

These sections can be configured to mutually deliver the information therebetween through a system bus 980.

Moreover, the part or whole of each of these sections may be implemented in a hardware manner such as circuits or in a software manner such as drivers.

The computer may implement the function of the projection area information generating section 150 according to a program that has been stored in and is read out of an information storage medium 900, the program being operative for causing the computer to function as the projection area information generating section 150 and the like.

Such an information storage medium 900 may be accomplished, for example, by CD-ROM, DVD-ROM, ROM, RAM, HDD or the like. The program may be read out of the information storage medium 900 through either of the contact or non-contact type reading mode.

In place of the information storage medium 900, the aforementioned functions can be implemented by downloading a program or the like for implementing them from a host device or the like through a transmission channel.

Flow of Image Processing

Next, the flow of image processing using these sections will be described.

Figure 4:
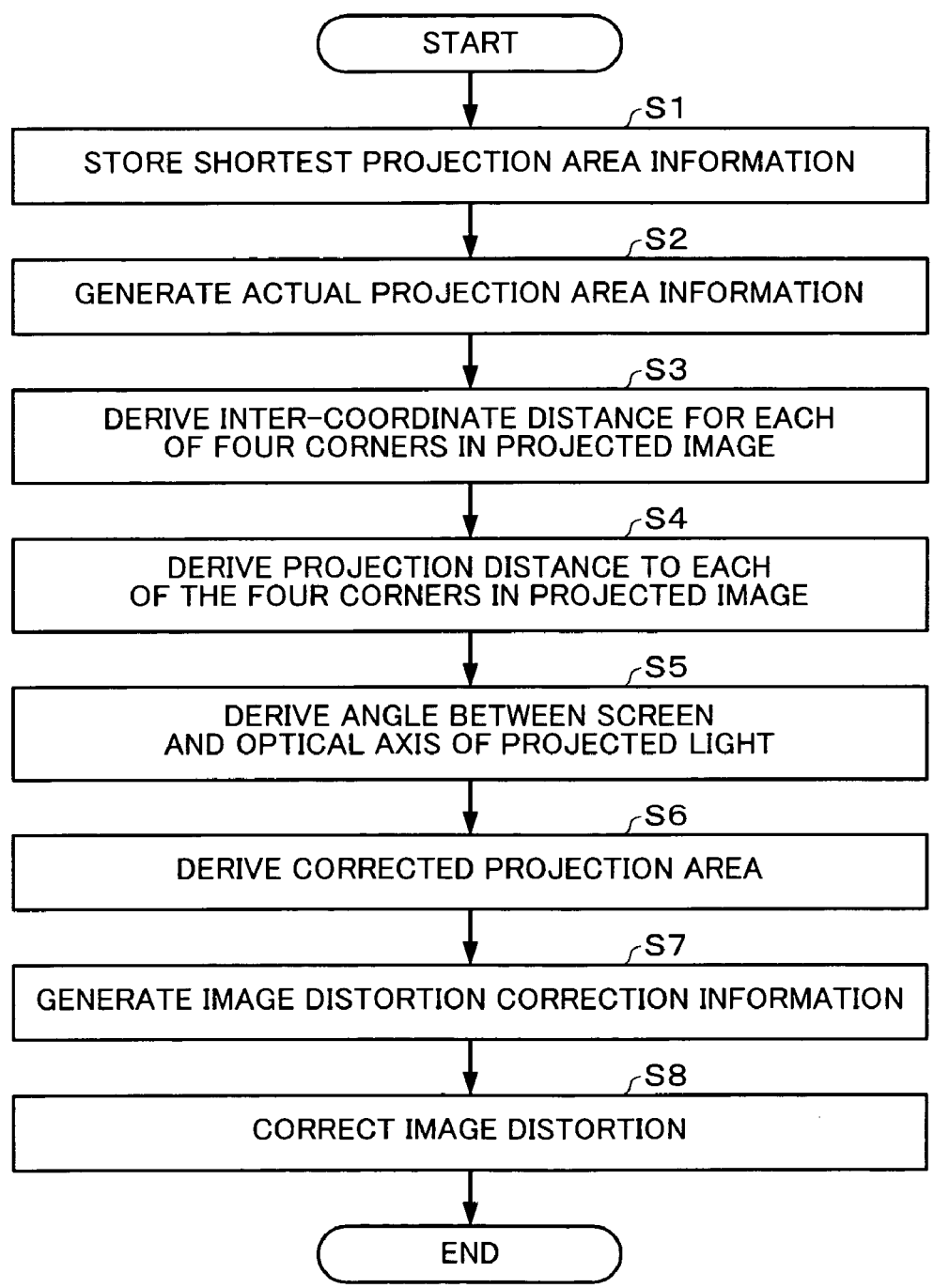
FIG. 4 is a flow chart illustrating a flow of image processing according to this example of this embodiment.

FIG. 4 is a flow chart illustrating a flow of image processing according to this example of this embodiment.

A manufacturer for the projector 20 has determined, prior to delivery of the projector 20, the relationship between the distances on the optical axis of the projected light between the reference projection position of the image projecting section 190 and four corners of the projected image 12 and the distances between coordinates in the sensing plane of the sensor 60 and stored it in the correction information generating section 120 as projection distance data.

Prior to delivery of the projector 20, the manufacturer has also located the screen 10 at a shortest-distance position (first or temporary position) at which the whole calibration image (or the projected image 12) falls within the sensing range in the sensor 60 under a condition that the projector 20 is positioned directly in front of the screen 10. The projector 20 projects a calibration image toward the screen 10, derives the coordinates of the four corners of the projected image 12 on the sensing plane, and stores them as shortest-distance projection area information (step S1).

More particularly, the calibration image information generating section 170 generates image information for an all-white monochromatic calibration image (i.e., white-colored image as a whole). The signal output section 160 outputs the digital signals of the image information toward the image projecting section 190.

The image projecting section 190 projects an all-white calibration image onto the screen 10, based on the digital signals. Thus, the all-white calibration image is displayed on the screen 10.

The sensing section 180 senses a region including the projected image 12 through the imaging sensing plane to generate sensing information. Here, the sensing information is one that indicates an image signal value which can generate a luminance value, XYZ value or the like for each pixel in the sensor 60. The XYZ value used herein is a kind of image signal value which is a device-independent color based on the International Standard defined by the Commission Internationale de l'Eclairage (CIE).

Next, the sensing plane and projection state will be described.

Figure 5:
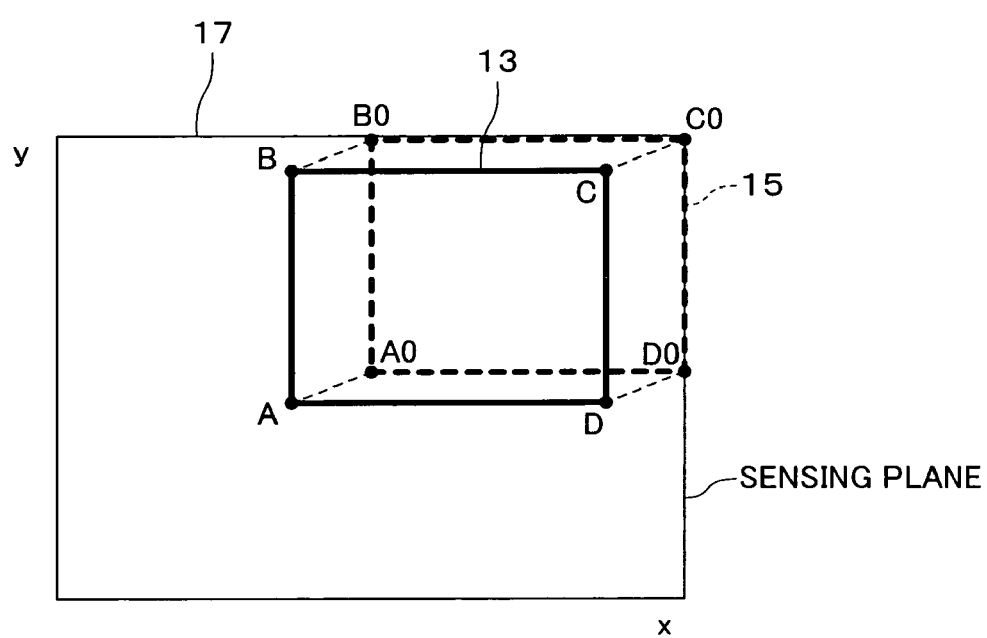
FIG.5 is a schematic view of a sensing plane according to this example of this embodiment.
Figure 6:
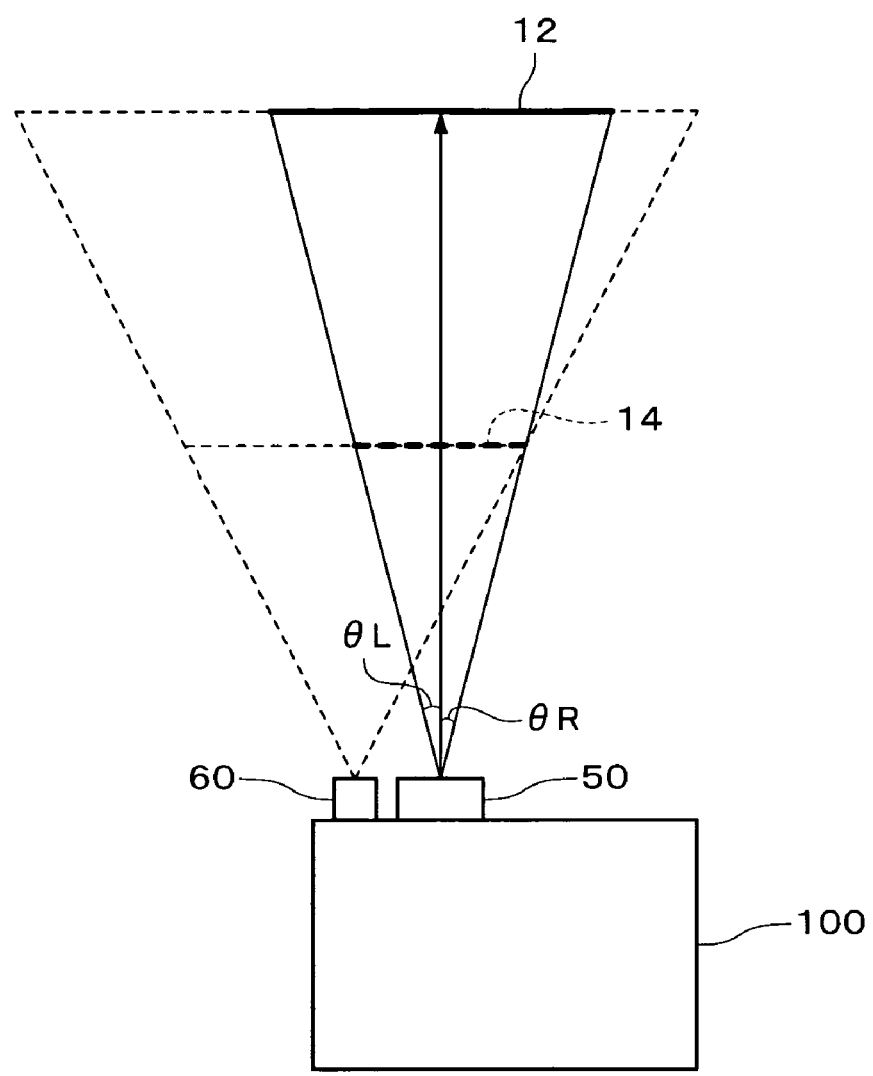
FIG. 6 is a schematic view illustrating, in a plan view, a state of projection according to this example of this embodiment.
Figure 7:
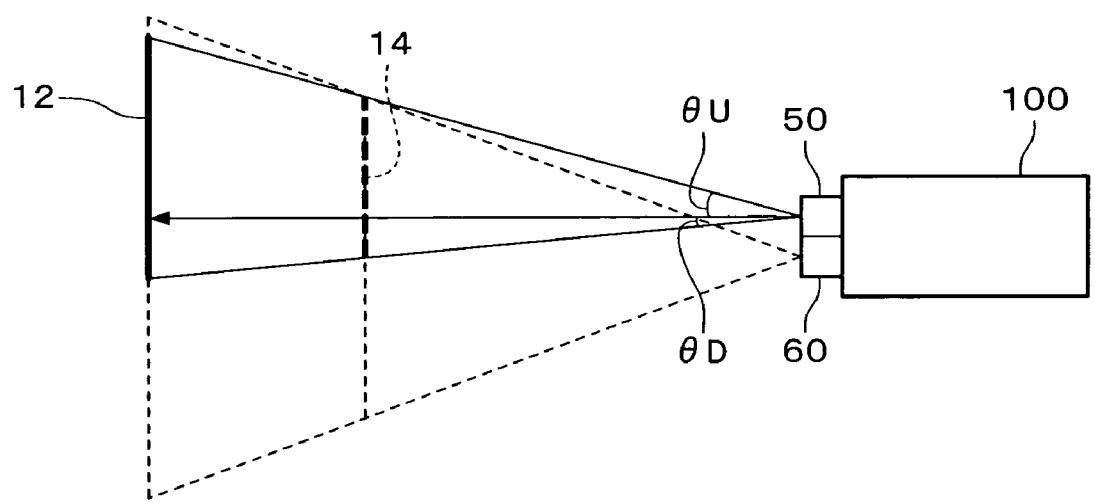
FIG. 7 is a schematic view illustrating, in a side view, a state of projection according to this example of this embodiment.

FIG. 5 is a schematic view illustrating the sensing plane 17 according to this example of this embodiment. FIG. 6 is a schematic view illustrating, in a plan view, a projection state according to this example of this embodiment. FIG. 7 is a schematic view illustrating, in a side view, a state of projection according to this example of this embodiment.

The sensing plane 17 shown in FIG. 5 is a plane at which the sensor 60 senses the image and also a region in which the sensing information of the sensor 60 is schematically shown in rectangular form. Specifically, the sensing plane 17 corresponds to, for example, that of a CCD sensor.

If the screen 10 is located at the minimum distance in which the entire calibration image falls within the sensing range in the sensor 60, the projected image 14 corresponds to the shortest-distance projection area 15 in the sensing plane 17, which is surrounded by four vertexes A0 to D0.

The projected image 12 in the actual operating environment corresponds to the actual projection area 13 in the sensing plane 17, which is surrounded by four vertexes A to D.

The projection area information generating section 150 generates shortest-distance projection area information (first or temporary projection area information) representing the coordinates of the four vertexes A0 to D0 of the shortest-distance projection area 15 in the sensing plane 17, based on the sensing information for the projected image 14 from the sensing section 180.

The manufacturer has also sensed images through the sensor 60 while moving the projector 20 away from the screen 10 within a range of projection between the minimum and maximum distances. The maximum distance used herein is the longest distance on the optical axis of the projected light, which quality is assured by the maker, when the projector 20 is positioned directly in front of the screen 10.

The correction information generating section 120 determines the projection area information within the range of projection between the minimum and maximum distances and the projection distance at each point of time. The correction information generating section 120, then computes inter-coordinate distances at the respective one of the sensed projection distances, each of the inter-coordinate distances representing a deviation (e.g., dots) between the coordinate of each of the four corners in the sensing plane 17 of the projected image 12 and the coordinate of each of the four corners of the projection image 12 when it is projected at the minimum distance.

The correction information generating section 120 further generates and stores a two-dimensional lookup table in which the inter-coordinate distances are associated with the projection distance as projection distance data.

By the above-mentioned procedure, the manufacturer can deliver the projector 20 which has stored the projection distance data in which the inter-coordinate distance between the projections at the minimum and maximum distances is associated with the projection distance as well as the shortest-distance projection area information.

When a user first uses the projector 20 in the actual operating environment, the projection area information generating section 150 generates the actual projection area information (second projection area information) representing the coordinates of the four vertexes A to D of the actual projection area 13 in the sensing plane 17, based on the sensing information for the projected image 12 from the sensing section 180 in the actual operating environment (step S2).

The correction information generating section 120 then derives an inter-coordinate distance in the sensing plane 17 between each of the vertexes of the actual projection area 13 and corresponding one of the vertexes of the shortest-distance projection area 15, based on the shortest-distance projection area information and the actual projection area information (step S3).

The correction information generating section 120 then derives the projection distance based on the inter-coordinate distance and projection distance data (step S4).

Figure 8:
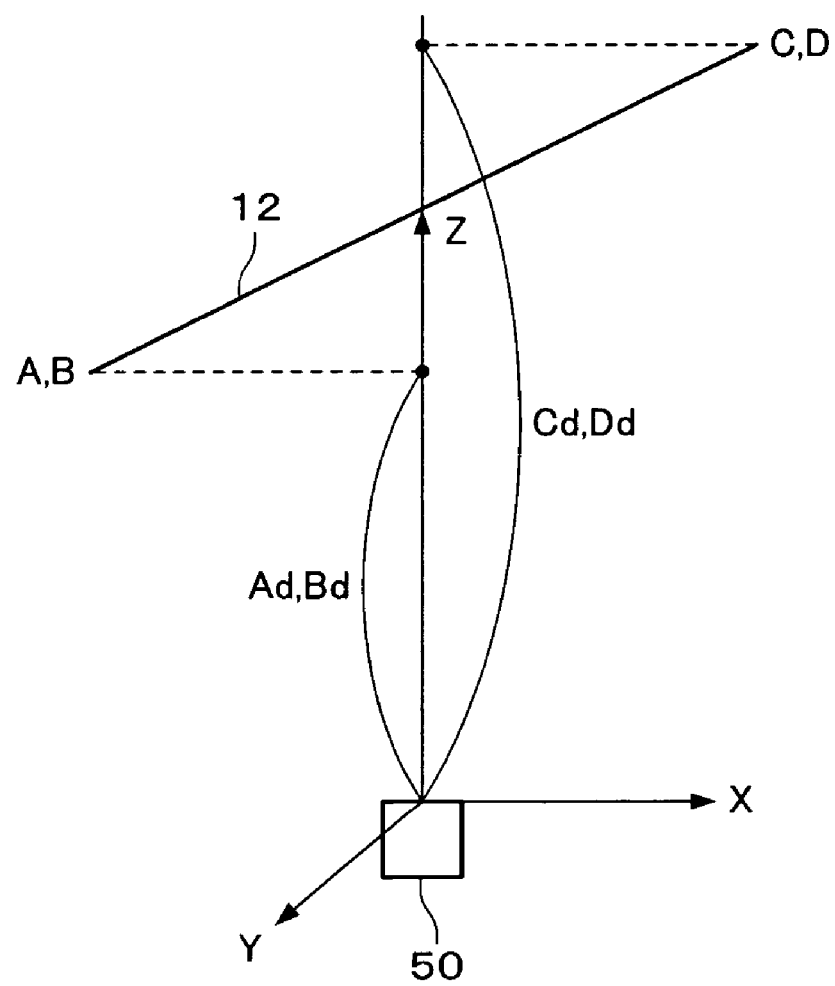
FIG. 8 is a schematic view illustrating a projection distance according to this example of this embodiment.

FIG. 8 is a schematic view illustrating a projection distance according to this example of this embodiment. FIG. 9 is a schematic view illustrating the data structure of the projection distance according to this example of this embodiment.

It is now assumed that a position at which a projection lens section 50 including the lens 198 emits the projected light (reference projection position) is an origin and that the lens plane is X-Y plane while the optical axis of the projected light is Z-axis. In this case, the correction information generating section 120 derives a projection distance Ad, Bd, Cd or Dd on the Z-axis between a shortest-distance point between each of the vertexes A, B, C or D in the projected image 12 and the Z-axis, and the origin.

More specifically, the correction information generating section 120 derives a projection distance (Ad, Bd, Cd or Dd) to each of the four corners of the projected image 12, based on the derived inter-coordinate distances and the projection distance data indicative of the relationship between the derived inter-coordinate distances and the projection distances. For example, in such projection distance data as shown in FIG. 9, the projection distance is equal to 1.5m if the inter-coordinate distance is zero dots. The projection distance data may be common to all the four vertexes or individual from one vertex to another.

It is further assumed that each half angle-of-view in the projection lens section 50 is $\theta R$ on the right side; $\theta L$ on the left side; $\theta U$ on the upper side; or $\theta D$ on the lower side as shown in FIGS. 6 and 7.

In this case, the projector coordinates A', B', C' and D' of the four corners of the projected image 12 (coordinates in the three-dimensional space for processing the spatial light modulator 192) are:

$A'(A'x, A'y, A'z)=(Ad*\tan(\theta L), Ad*\tan(\theta D), Ad)$;

$B'(B'x, B'y, B'z)=(Bd*\tan(\theta L), Bd*\tan(\theta U), Bd)$;

$C'(C'x, C'y, C'z)=(Cd*\tan(\theta R), Cd*\tan(\theta U), Cd)$; and $D'(D'x, D'y, D'z)=(Dd*\tan(\theta R), Dd*\tan(\theta D), Dd)$.

The correction information generating section 120 computes the normal vector N (Nx, Ny, Nz) in the screen 10 on which the projected image 12 is displayed by use of three points among these projector coordinates. For example, when three points A', C' and D' are used, $Nx=(D'y-C'y)*(A'z-D'z)-(D'z-C'z)*(A'y-D'y)$;

$Ny=(D'z-C'z)*(A'x-D'x)-(D'x-C'x)*(A'z-D'z)$; and $Nz=(D'x-C'x)*(A'y-D'y)-(D'y-C'y)*(A'x-D'x)$.

The correction information generating section 120 also derives an angle ($\theta x$ in the horizontal direction or $\theta y$ in the vertical direction) which is formed by the normal vector N and a directional vector (0, 0, 1) of the optical axis of the projection lens section 50 (step S5). This angle corresponds to an angle formed by the screen 10 and the optical axis of the projected light from the projector 20.

The correction information generating section 120 further derives coordinates of four corners E, F, G and H in the corrected projection area by searching the coordinates of the four corners in the corrected projection area from correcting data based on this angle (i.e., θx or θy) (step S6).

Figure 10:
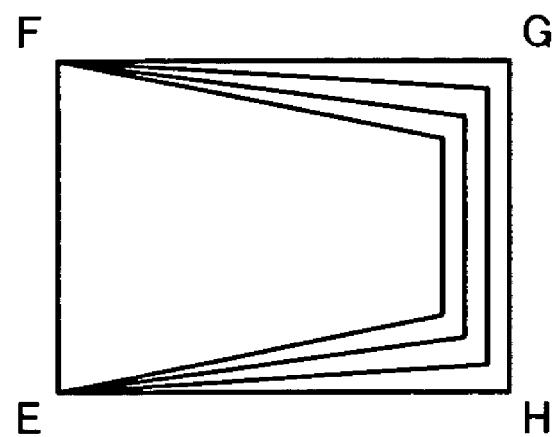
FIG. 10 is a schematic view illustrating four corner coordinates in a corrected projection area according to this example of this embodiment.

FIG. 10 is a schematic view illustrating four corner coordinates in a corrected projection area according to this example of this embodiment. FIG. 11 is correcting data illustrating four corner coordinates in a corrected projection area according to this example of this embodiment.

In the aforementioned correcting data, the values of θx and θy are associated with the x-y coordinate of the respective one of the coordinates of the four corners E, F, G and H in the corrected projection area, as shown in FIG. 11. It is noted that the coordinates of the four corners E, F, G and H in the corrected projection area are coordinates in the spatial light modulator 192, for example.

The correction information generating section 120 then generates image distortion correction information by using the x-y coordinate of the respective one of the coordinates E, F, G and H in the correcting data shown in FIG. 11 (step S7), and sends them to the distortion correcting section 130. The image distortion correction information used herein may correspond to information indicative of differential values between the coordinates of the four corners of the image before and after the distortion thereof is corrected, for example.

The distortion correcting section 130 then corrects image signals to correct the image distortion, based on the image distortion correction information (step S8. However, the distortion correcting section 130 may indirectly correct the image signals by correcting the distortion correcting data such as lookup table or matrix, based on the image distortion correction information or may directly correct the image signals without the use of the distortion correcting data.

Thus, the image projecting section 190 can project the image after the distortion thereof has been corrected.

As described, according to this embodiment, the distortion of the projected image 12 can be corrected by measuring the distance and angle between the point of the projection lens section 50 at which the light is projected and the screen 10 through only a single sensor 60.

Thus, the manufacturer can provide an image processing system which is of a simpler structure produced in lower cost, in comparison with the prior art technique of detecting the three-dimensional coordinates of the projected image by use of a plurality of CCD cameras.

According to this embodiment, furthermore, the distortion of the projected image 12 can be corrected without use of the four corners in the screen 10. In other words, this embodiment may be applied to various kinds of projection targets (e.g., white board, wall or the like). Furthermore, this embodiment may be less influenced by the color and material of the projection target. According to this embodiment, thus, the versatility of the image processing system and the like can be more improved.

According to this embodiment, furthermore, the projector 20 can derive the projection distance based on the inter-coordinate distance between two corresponding points in the sensing plane 17 without using the directional information of coordinate by using the coordinates of the projected image 12 in the sensing plane 17 when the image is projected at the minimum distance. Thus, the projector 20 can more simply and easily derive the projection distance to correct the distortion of the projected image 12.

Modifications

The application of the present invention is not limited to the aforementioned embodiment.

For example, if the projector 20 has a focus adjusting function, the projector 20 may comprise a control means for automatically adjusting the focus based on the distance information between the projector 20 and the screen 10, which has been generated by the correction information generating section 120.

Although the aforementioned embodiment has been described as to the sensor 60 fixedly mounted in the projector 20, a positioning mechanism (e.g., an arm mechanism) for the sensor 60 may be provided so that upon calibration, the sensor 60 senses the projected image 12 under a state that the projection lens section 50 is located farther apart from the sensor 60.

Thus, the measurement accuracy of the sensor 60 can be more improved.

In the aforementioned embodiment, the projector 20 generates the actual projection area information based on the sensing information in the actual operating condition and also generates the temporary projection area information based on the sensing information at the minimum distance in which the calibration image falls within the sensing range. However, the temporary projection area information may be generated based on the sensing information which are obtained when the projector 20 and screen 10 are placed under such a state that the calibration image falls within the sensing range and under such a state that the positional relationship therebetween is different from the actual operating state, rather than the minimum distance.

In the aforementioned embodiment, the two-dimensional lookup table is used as the projection distance data in which the projection distance is associated with the inter-coordinate distance. However, a function of inputting the inter-coordinate distance and outputting the projection distance may be used.

Although the aforementioned embodiment has been described as to the all-white calibration image, any monochromic calibration image other than white color may be used. Furthermore, the projector 20 may project and sense an all-black calibration image (the entire image being black-colored) and also an all-white calibration image, compare the ratios of luminance value between each pair of adjacent pixels included in the sensing information, and determine a pixel area having its luminance ratio more than a predetermined value as a projection area.

Thus, the projector 20 will less be influenced by any damage in the screen 10 or by any ambient light or the like relative to the screen 10. Therefore, the projector 20 can more precisely determine the projection area.

Although the aforementioned embodiment uses the projector 20 as an image processing system, the present invention is effective for an image processing system for CRT (Cathode Ray Tube) displays, LED (Light Emitting Diode) displays, EL (Electro Luminescence) displays and other displays, in addition to the projector 20.

The projector 20 may be of liquid crystal projector, a DMD (Digital Micromirror Device) projector, for example. Here, DMD is a trademark possessed by Texas Instruments Inc. of the USA.

Furthermore, the function of the projector 20 may be accomplished solely by the projector 20 or in dispersion by a plurality of decentralized processing units (e.g., one projector and one PC).

What is claimed is:

1. An image processing system comprising:
a calibration image information generating means for generating image information used to display a rectangular calibration image;
a projection means for projecting the calibration image onto a projection target, based on the image information;
a sensing means for generating sensing information of a region including the projected calibration image through a sensing plane of the sensing means;
a projection area information generating means for:
   generating temporary projection area information which indicates coordinates of four corners of the calibration image on the sensing plane, based on only the sensing information in such a state that an entire portion of the calibration image is included within a sensing range of the sensing means and under such a state that a distance between the projection means and the projection target is different from the distance in an actual operating condition, and
   generating actual projection area information which indicates the coordinates of the four corners of the calibration image in the sensing plane, based on only the sensing information in the actual operating condition;
a correction information generating means for:
   deriving an inter-coordinate distance between each of the coordinates of the four corners included in the temporary projection area information and corresponding one of the coordinates of the four corners included in the actual projection area information;
   deriving a projection distance on an optical axis of the projection means between the projection means and each of the four corners of the calibration image on the projection target, based on projection distance data in which the inter-coordinate distance is associated with the projection distance and based on the inter-coordinate distance;
   deriving three-dimensional coordinates of at least three of the four corners of the calibration image in a three-dimensional space for the projection means to process an image, based on the projection distance and a half angle-of-view in the projection means;
   deriving an angle formed by the optical axis of the projection means and the projection target, based on the three-dimensional coordinates; and
   generating the image distortion correction information, based on the derived angle; and
a distortion correction means for correcting a distortion of the image, based on the image distortion correction information.

2. The image processing system as defined in claim 1, wherein the correction information generating means has following functions of:
deriving a normal vector in the projection target, based on the three-dimensional coordinates; and
deriving an angle formed by the optical axis of the projection means and the projection target, based on the normal vector and a directional vector of the optical axis of the projection means.

3. An image processing system comprising:
a calibration image information generating section which generates image information used to display a rectangular calibration image;
a projection section which projects the calibration image onto a projection target, based on the image information;
a sensor that generates sensing information of a region including the projected calibration image through a sensing plane of the sensor;
a projection area information generating section that:
   generates temporary projection area information which indicates coordinates of four corners of the calibration image on the sensing plane, based on only the sensing information in such a state that an entire portion of the calibration image is included within a sensing range of the sensor and under such a state that a distance between the projection section and the projection target is different from the distance in an actual operating condition, and
   generates actual projection area information which indicates the coordinates of the four corners of the calibration image in the sensing plane, based on only the sensing information in the actual operating condition;
a correction information generating section that:
   derives an inter-coordinate distance between each of the coordinates of the four corners included in the temporary projection area information and corresponding one of the coordinates of the four corners included in the actual projection area information;
   derives a projection distance on an optical axis of the projection section between the projection section and each of the four corners of the calibration image on the projection target, based on projection distance data in which the inter-coordinate distance is associated with the projection distance and based on the inter-coordinate distance;
   derives three-dimensional coordinates of at least three of the four corners of the calibration image in a three-dimensional space for the projection section to process an image, based on the projection distance and a half angle-of-view in the projection section;
   derives an angle formed by the optical axis of the projection section and the projection target, based on the three-dimensional coordinates; and
   generates the image distortion correction information, based on the derived angle; and
a distortion correction section that corrects a distortion of the image, based on the image distortion correction information.

4. A projector comprising:
a calibration image information generating means for generating image information used to display a rectangular calibration image;
a projection means for projecting the calibration image onto a projection target, based on the image information;
a sensing means for generating sensing information of a region including the projected calibration image through a sensing plane of the sensing means;
a projection area information generating means for:
   generating temporary projection area information which indicates coordinates of four corners of the calibration image on the sensing plane, based on only the sensing information in such a state that an entire portion of the calibration image is included within a sensing range of the sensing means and under such a state that a distance between the projection means and the projection target is different from the distance in an actual operating condition, and
   generating actual projection area information which indicates the coordinates of the four corners of the calibration image in the sensing plane, based on only the sensing information in the actual operating condition;

a correction information generating means for:
  deriving an inter-coordinate distance between each of the coordinates of the four corners included in the temporary projection area information and corresponding one of the coordinates of the four corners included in the actual projection area information;
  deriving a projection distance on an optical axis of the projection means between the projection means and each of the four corners of the calibration image on the projection target, based on projection distance data in which the inter-coordinate distance is associated with the projection distance and based on the inter-coordinate distance;
  deriving three-dimensional coordinates of at least three of the four corners of the calibration image in a three-dimensional space for the projection means to process an image, based on the projection distance and a half angle-of-view in the projection means;
  deriving an angle formed by the optical axis of the projection means and the projection target, based on the three-dimensional coordinates; and
  generating the image distortion correction information, based on the derived angle; and
a distortion correction means for correcting a distortion of the image, based on the image distortion correction information.

5. A projector comprising:
a calibration image information generating section which generates image information used to display a rectangular calibration image;
a projection section which projects the calibration image onto a projection target, based on the image information;
a sensor that generates sensing information of a region including the projected calibration image through a sensing plane of the sensor;
a projection area information generating section that:
  generates temporary projection area information which indicates coordinates of four corners of the calibration image on the sensing plane, based on only the sensing information in such a state that an entire portion of the calibration image is included within a sensing range of the sensor and under such a state that a distance between the projection section and the projection target is different from the distance in an actual operating condition, and
  generates actual projection area information which indicates the coordinates of the four corners of the calibration image in the sensing plane, based on only the sensing information in the actual operating condition;
a correction information generating section that:
  derives an inter-coordinate distance between each of the coordinates of the four corners included in the temporary projection area information and corresponding one of the coordinates of the four corners included in the actual projection area information;
  derives a projection distance on an optical axis of the projection section between the projection section and each of the four corners of the calibration image on the projection target, based on projection distance data in which the inter-coordinate distance is associated with the projection distance and based on the inter-coordinate distance;
  derives three-dimensional coordinates of at least three of the four corners of the calibration image in a three-dimensional space for the projection section to process an image, based on the projection distance and a half angle-of-view in the projection section;
  derives an angle formed by the optical axis of the projection section and the projection target, based on the three-dimensional coordinates; and
  generates the image distortion correction information, based on the derived angle; and
a distortion correction section that corrects a distortion of the image, based on the image distortion correction information.

6. An information storage medium storing a computer-readable program which causes a computer to:
generate image information used to display a rectangular calibration image;
project the calibration image onto a projection target, based on the image information;
sense a region including the projected calibration image through a sensing plane of a sensor and generate sensing information;
generate temporary projection area information which indicates coordinates of four corners of the calibration image on the sensing plane, based on only the sensing information in such a state that an entire portion of the calibration image is included within a sensing range of the sensor and under such a state that a distance between a projector and the projection target is different from the distance in an actual operating condition, and generate actual projection area information which indicates the coordinates of the four corners of the calibration image in the sensing plane, based on only the sensing information in the actual operating condition;
derive an inter-coordinate distance between each of the coordinates of the four corners included in the temporary projection area information and corresponding one of the coordinates of the four corners included in the actual projection area information;
derive a projection distance on an optical axis of the projector between the projector and each of the four corners of the calibration image on the projection target, based on projection distance data in which the inter-coordinate distance is associated with the projection distance and based on the inter-coordinate distance;
derive three-dimensional coordinates of at least three of the four corners of the calibration image in a three-dimensional space for the projector to process an image, based on the projection distance and a half angle-of-view in the projector;
derive an angle formed by the optical axis of the projector and the projection target, based on the three-dimensional coordinates;
generate the image distortion correction information, based on the derived angle; and
correct a distortion of the image, based on the image distortion correction information.

7. An image processing method comprising:
causing an image projection device to project a rectangular calibration image onto a projection target, and generating first projection area information, which indicates coordinates of four corners of the calibration image in a sensing plane of a sensor, based only on sensing a region including the projected calibration image by the sensor through the sensing plane when a positional relationship between the image projection device and the projection target becomes a first state in which an entire portion of the calibration image is included within a sensing range;
causing the image projection device to project the calibration image onto the projection target, and generating second projection area information, which indicates the coordinates of the four corners of the calibration image in the sensing plane, based only on sensing a region including the projected calibration image by the sensor through the sensing plane when the positional relationship between the image projection device and the projection target becomes a second state in which an entire portion of the rectangular calibration image is included within the sensing range, the second state being different from the first state;

deriving an inter-coordinate distance between each of the coordinates of the four corners included in the first projection area information and the corresponding one of the coordinates of the four corners included in the second projection area information;

deriving a projection distance on an optical axis of a projected light between the image projection device and each of the coordinates of the four corners of the calibration image on the projection target, based on the projection distance data in which the inter-coordinate distance is associated with the projection distance and based on the inter-coordinate distance;

deriving three-dimensional coordinates of at least three of the four corners of the calibration image in a three-dimensional space for the image projecting device to process an image, based on the projection distance and a half angle-of-view in the projected light;

deriving an angle formed by the optical axis of the projected light and the projection target, based on the three-dimensional coordinates;

generating image distortion correction information, based on the derived angle; and correcting image distortion, based on the generated image distortion correction information.

8. The image processing method as defined in claim 7, when the angle formed by the optical axis of the projected light and the projection target is derived, the method comprising:

deriving a normal vector in the projection target, based on the three-dimensional coordinates; and deriving an angle formed by the optical axis of the projected light and the projection target, based on the normal vector and a directional vector of the optical axis of the projected light.

* * * * *